United States Patent
Trombetta et al.

(10) Patent No.: US 7,015,278 B2
(45) Date of Patent: Mar. 21, 2006

(54) HYDRO-OIL-REPELLENT COMPOSITIONS

(75) Inventors: Tania Trombetta, Milan (IT); Stefano Turri, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 377 days.

(21) Appl. No.: 10/330,058

(22) Filed: Dec. 30, 2002

(65) Prior Publication Data

US 2003/0166769 A1 Sep. 4, 2003

(30) Foreign Application Priority Data

Jan. 10, 2002 (IT) .......................... MI2002A0029

(51) Int. Cl.
- C08J 3/00 (2006.01)
- C08K 3/20 (2006.01)
- C08L 75/00 (2006.01)
- B32B 5/16 (2006.01)
- B32B 27/20 (2006.01)

(52) U.S. Cl. ................ 524/591; 427/372.2; 427/385.5; 428/423.1; 442/74; 442/79; 442/80; 442/83; 442/92; 442/94; 524/839; 524/840

(58) Field of Classification Search ................ 524/591, 524/839, 840; 428/423.1; 427/372.2, 385.5; 442/74, 79, 80, 83, 92, 94
See application file for complete search history.

(56) References Cited

U.S. PATENT DOCUMENTS

| | | | |
|---|---|---|---|
| 2,995,542 A | 8/1961 | Brown et al. | |
| 3,242,218 A | 3/1966 | Miller et al. | |
| 3,356,628 A | 12/1967 | Smith et al. | |
| 3,715,378 A | 2/1973 | Sianesi et al. | |
| 3,810,874 A | 5/1974 | Mitsch et al. | |
| 3,935,277 A | 1/1976 | Dear et al. | |
| 4,523,039 A | 6/1985 | Lagow et al. | |
| 4,529,658 A | 7/1985 | Schwartz et al. | |
| 4,647,413 A | 3/1987 | Savu | |
| 5,149,842 A | 9/1992 | Sianesi et al. | |
| 5,258,110 A | 11/1993 | Sianesi et al. | |
| 5,910,557 A | 6/1999 | Audenaert et al. | |

FOREIGN PATENT DOCUMENTS

| | | |
|---|---|---|
| EP | 0 148 482 A1 | 7/1985 |
| EP | 0 239 123 A2 | 9/1987 |
| EP | 0 273 449 B1 | 1/1988 |
| EP | 0273449 A1 | 7/1988 |
| EP | 0 340 740 A2 | 11/1989 |
| EP | 1038919 A1 | 9/2000 |
| EP | 1059319 A2 | 12/2000 |
| EP | 1162220 A1 | 12/2001 |
| EP | 1059319 A3 | 1/2002 |
| IT | 1104482 | 2/1968 |
| WO | WO 90/03357 | 4/1990 |

*Primary Examiner*—Patrick D. Niland
(74) *Attorney, Agent, or Firm*—Arent Fox PLLC

(57) ABSTRACT

Formulations formed by aqueous dispersions of cationic ionomer fluorinated polyurethanes based on (per)fluoropolyethers, having end groups constituted by —NCO groups reacted with hydrogenactive compounds to give covalent bonds stable to water but thermolabile, usable for the surface hydro- and oil-repellent treatment of textiles.

21 Claims, No Drawings

HYDRO-OIL-REPELLENT COMPOSITIONS

The present invention relates to formulations for textiles to confer an optimal combination of hydro- and oil-repellence and "softness" and capable to maintain said optimal combination of properties even after several washings at high tempertures, also in the presence of detergents.

By "softness" it is meant the fabric property, after treating with the invention formulations, to substantially maintain the softness properties to the touch of the untreated textile specimen taken as reference.

By hydro-repellence it is meant that the fabric subjected to the hydro-repellence test (as defined hereafter) passes the rating value as defined.

By oil-repellence it is meant that the fabric subjected to the AATCC Standard test 118-1978, passes the rating value as defined.

To make textiles hydro- and oil-repellent the use of various kinds of polymers, also fluorinated, is known in the prior art. Polymers having an acrylic and polyurethane structure wherein the fluorinated part is formed by perfluoro-carbon side chains, can for example be mentioned. Other used fluorinated polymers are polyurethanes having a perfluoropolyether structure in the chain. The appliction to textiles is made by the corresponding aqueous dispersions.

U.S. Pat. Nos. 2,995,542, 3,356,628 and U.S. Pat. No. 4,529,658 describe the synthesis of fluoroacrylic polymers and their use for the textile treatment. The use of said polymers allows to obtain good hydro- and oil-repellence values. However they show the drawback not to maintain said properties after several washings. Besides, the fluoroacrylic polymers show also the drawback to reduce the transpirability and modify the initial "softness" of the fabric (which becomes more rigid) at room temperature and especially at temperatures lower than 5° C., in particular at −10° C. Said temperatures are of application interest for the winter-sport wear sector.

U.S. Pat. No. 5,910,557 describes compositions containing non ionomer hydrogenated polyurethanes having fluoroalkyl said-chains. The polymer contains —NCO groups blocked with protective groups. To obtain stable dispersions in water of said polymers it is necessary to use high amounts of surfactant. It is well known that high amounts of surfactant can compete with the polymer to be applied and therefore unhomogeneities of the treatment efficacy can occur. This happens in particular in continuous industrial padding processes wherein it is necessary to control the bath composition when mixtures of compounds are present therein. Therefore from the industrial point of view it is desirable to have available stable polymer dispersions without using surfactants.

U.S. Pat. No. 3,935,277 describes non fluorinated polyurethanes with perfluoroalkyl side chains. Said structures can contain also salifiable monomers of dialkanolaminic type. In said patent tests of washing resistance are not shown. EP 273,449 describes the use of fluorinated polyurethanes having a perfluoropolyether structure to confer hydro-repellence to textiles. The Applicant has found that the hydro- and oleo-repellence of textiles treated with said polymers decreases with washings. See comparative Examples.

The need was therefore felt to have available aqueous dispersions of fluorinated polymers having the following combination of properties:
to be dispersible in water without the addition of surfactants and to remain stable in the time;
to confer good hydro- and oil-repellence properties to textiles and maintenance of said properties even after several washings;
to mantain the initial appearance and "softness", even after several washings and also at temperatures lower than 0° C., also for example at −10° C.;
textile transpirability.

It has been surprisingly and unexpectedly found that it is possible to solve said technical problem by treating txtiles with formulations in the form of aqueous dispersions containing fluorinated polymers as defined below.

An object of the present invention are formulations formed by aqueous dispersions of cationic ionomer fluorinated polyurethanes based on (per) fluoropolyethers, said polyurethanes having as end groups —NCO groups reacted with hydrogenactive compounds to give covalent bonds stable to water but thermolabile, i.e. which comply with the following test: by reacting the hydrogenactive cmpounds with tetramethyl-xylylenediisocyanate (TMXDI) and by thermal treatment between 80° C. and 180° C. for two minutes in the presence of dibutyltin dilaurate (DBTDL) as catalyst, at least 50% of the —NCO groups is restored.

The preferred hydrogenactive compounds are those which quantitatively restore the —NCO groups.

As blocking hydrogenactive compounds of the —NCO group it can be mentioned:
ketoximes, for example methylethylketoxime, 2,6-dimethyl-4-heptanone-oxime, 2-heptanone oxime;
phenols and mono-, di-alkyl substituted phenols wherein the alkyl chain contains from 1 to 9 carbon atoms;
pyrazole, 3,5-dimethylpyrazole, 1,2,4-triazole;
caprolactam;
aliphatic esters such for example ethylmalonate, ethylacetoacetate;
amides and imides, such as methylacetamide, succinimide, acetanilide;
amines such as isopropylamine;
aminoalcohols of formula:

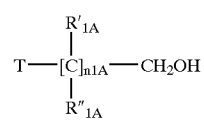

(1-A)

wherein T is a tertiary amino group $NR'_N R''_N$, wherein $R'_N$ and $R''_N$, equal or different, are linear or branched $C_1$–$C_6$ alkyl; $R'_{1A}$ and $R''_{1A}$, equal or different, are hydrogen or linear or branched $C_1$–$C_4$ alkyl; n1A is an integer in the range 1–10, preferably 1–4; for example dimethyl-aminoethanol, diethyl-aminoethanol, dimethyl-aminopropanol, diethyl-aminopropanol can be mentioned.

The aqueous compositions of the invention can contain high amounts of polyurthane, even up to 50% by weight.

The cationic fluorinated polyurethanes of the invention comprise units deriving from the following monomers:
a) hydrogenated diisocyanates having formula:

(VIa)

wherein R is a bifunctional radical:
$C_2$–$C_{12}$ aliphatic;
$C_6$–$C_{18}$ cycloaliphatic or aromatic, alkylen-cycloaliphatic or aromatic, wherein optionally the cycloaliphatic ring can be substituted with one or more $C_1$–$C_3$ alkyl groups; bicyclo aliphatic or aromatic wherein the rings are as above, optionally linked by a $C_1$–$C_6$ alkylene chain;

b) bifunctional (per)fluoropolyethers (PFPE) having hydroxyl end groups, with number average molecular weight in the range 400–4,000, preferably 700–2,000;

c) one or more of the following diols containing an amino group:

c.1 diols with side amino group, of formula:

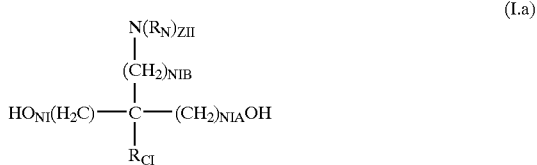

(I.a)

wherein $R_N$ is a linear or branched $C_1$–$C_6$ alkyl, zII is 1 or 2, when zII=1 the nitrogen free valence is saturated with one H atom, $R_{CI}$ is H or $C_1$–$C_4$ alkyl, NI is an integer and ranges from 1 to 4, NIA is an integer and ranges from 0 to 4, NIB is an integer and ranges from 1 to 4.

Examples of diols c.1 are 3-dimethylamino-1, 2-propandiol, 4-dimethylamino-1,2-butandiol, 3-diethylamino-1,2-propandiol;

c.2 diols with amino group in the chain, of formula:

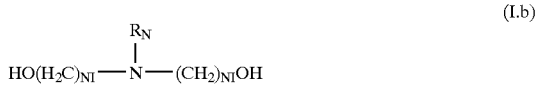

(I.b)

wherein $R_N$ and NI have the above meanings; examples of said amines are methyldiethanolamine, butyldiethanolamine, methyldiisopropanolamine;;

d) hydrogenactive compounds capable to form with the —NCO functions covalent bonds which are stable at the hydrolysis but thermolabile, said compounds known as blocking agents of the —NCO group, and selected from those known in the prior art as for example those above mentioned;

optionally it can be added:

e) $C_2$–$C_{10}$ hydrogenated aliphatic diols or diamines, $C_4$–$C_6$ cycloaliphatic, optionally substituted with $C_1$–$C_4$ aliphatic chains, and $C_6$–$C_{14}$ aromatic or alkyl aromatic.

When the hydrogenactive compound component d) is an aminoalcohol component c) is optional. Examples of said hydrogenactive compounds are the above aminoalcohols of formula (1-A).

Components a), b), c) and d) are generally present in the following amounts by weight with respect to the total of the components: component a): 5–50%; component b): 50–90%; component c): 1–10%, component c) optionally being absent when component d) is an aminoalcohol, component d): 0.1–10%; component e): 0–10%.

Preferably the diisocyanates a) are selected from the following: hexamethylendiisocyanate (HDI), trimethylhexamethylenediisocyanate, isophorone diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or its isomers, xylylene diisocyanate, naphthalene-1,5-diisocyanate, p-phenylendiisocyanate, tetramethyl-xylylenediisocyanate (TMXDI).

The number average molecular weights of the polyurethanes of the invention are generally in the range 5,000–50,000, preferably 9,000–35,000.

The ionomer polyurethanes based on (per)fluoropolyethers according to the present invention have a fluorine content preferably higher than 15% by weight, more preferably higher than 25% by weight, still more preferably from 30 to 40% by weight.

The chemical classes of catalysts for the synthesis of the polyurethanes of the invention are well known in the prior art, for example the above mentioned catalyst to unblock the thermolabile groups can be mentioned.

The cationic ionomer polyurethanes are for example obtained by polymerization comprising the following steps:

a first step, wherein a —NCO ended bifunctional fluorinated prepolymer is prepared by reacting with the diisocyanates component a), in organic solvents of polar type, partially or totally soluble in water as for example ketones and esters, bifunctional perfluoropolyethers component b);

a second step, carried out as indicated hereafter:

Ia) partial chain extension by chain extenders component c) in a lower amount with respect to the —NCO groups present, optionally said extenders comprising also diols and/or diamines component e), the total amount of c)+e) being lower with respect to the —NCO groups present;

Ib) completion of the reaction of the —NCO groups in excess by adding the hydrogenactive compounds component d);

Ic) salification and dispersion in water.

The salification of the polymer Ic) is carried out on the tertiary amine with organic or inorganic acids as hydrochloric, phosphoric, formic, acetic, lactic acid, etc., or by carrying out the nitrogen quaternarization with nitrogen alkylation agents known in the prior art, for example methyl iodide, dimethylsulphate, benzyl bromide, etc.

Said salts are prepared by adding the acid to the reaction solution containing the polyurethane in a mixed aqueous/organic solvent, wherein the organic solvent, as said, is partially or totally soluble in water. An example of a solvent partially soluble in water is ethyl acetate.

The functionalized PFPEs component b) comprise repeating units, statistically distributed in the polymer chain, selected from the following:

$(C_3F_6O)$, $(CF_2CF_2O)$, $(CF(CF_3)O)$, $(CF_2O)$
$(CF_2(CF_2)_{x'}CF_2O)$ wherein x' is an integer equal to 1 or 2, $(CF_2CF_2CH_2O)$.

The unit $(C_3F_6O)$ can have the structure:
$(CF(CF_3)—CF_2O)$ or $(CF_2—CF(CF_3)O)$.

In particular PFPEs belong to one or more of the following classes:

1) —$CF_2$—O—$(CF_2CF_2O)_{p'}(CF_2O)_{q'}$—$CF_2$— wherein:

p' and q' are numbers such that the q'/p' ratio is comprised between 0.1 and 10 and the number average molecular weight is within the above range for component b);

2) —CFY—O—$(CF_2CF(CF_3)O)_{r'}$—$(CF_2CF_2O)_{s'}$—$(CFYO)_{t'}$—CFY— wherein:

Y is F, $CF_3$; r', s' and t' are numbers such that r'+s' is comprised between 1 and 50, the t'/(r'+s') ratio is comprised between 0.01 and 0.05, r'+s' being different from zero, and the molecular weight is in the above range for component b);

3) $-CF(CF_3)(OCFY)_{r'}(OC_3F_6)_{u'}-OR'_fO-(C_3F_6O)_{u''}(CFYO)_{t'}CF(CF_3)-$ wherein:

$R'_f$ is a $C_1-C_8$ perfluoroalkylene; u'+t' is a number such that the number average molecular weight is in the above range for component b); t' can also have the zero value; Y is as above;

4) $-CF_2CF_2O-(CF_2(CF_2)_{x'}CF_2O)_{v'}-CF_2CF_2-$ wherein:

v' is a number such that the molecular weight is within the above range for the (per)fluoropolyethers diols b), x' is an integer equal to 1 or 2;

5) $-CF_2CH_2-(OCF_2CF_2CH_2)_{w'}-OR'_fO-(CH_2CF_2CF_2O)_{w'}-CH_2CH_2-$ wherein:

$R'_f$ is as above; w' is a number such that the number average molecular weight is within the above range for the (per)fluoropolyethers diols b);

the end groups of the bifunctional perfluoropolyethers component b) being of the $-CH_2-(OCH_2CH_2)_{k'}-OH$ type, wherein k' is a number in the range 0–5, preferably 0–2.

The bifunctional (per)fluoropolyoxyalkylenes can be prepared starting from the corresponding (per)fluoropolyoxyalkylenes having end groups —COF (see for example GB 1,104,482, U.S. Pat. Nos. 3,715,378, 3,242,218, 4,647,413, EP 148,482, U.S. Pat. No. 4,523,039, EP 340,740, patent application WO 90/03357, U.S. Pat. No. 3,810,874, EP 239,123, U.S. Pat. Nos. 5,149,842, 5,258,110).

Preferably the repeating units in the PFPEs of the ionomer polyurethanes have a structure as defined in 1).

Examples of hydrogenactive compounds component d) are those above reported.

An advantage of the aqueous dispersions of the polyurethanes according to the present invention is that they remain stable in the time, also at high temperatures of the order of 50° C., and contrary from the compositions of the prior art, they do not require the addition of stabilizing agents such as for example surfactants, and therefore do not show the above drawbacks.

As said the aqueous dispersions of the present invention comprising cationic ionomer fluorinated polyurethanes based on perfluoropolyethers, are used for the surface hydro- and oil-repellent treatment of textile fibers and textiles, in particular natural fiber textiles, for example cotton, silk, wool; synthetic fiber textiles, for example acrylic, polyamidic, polyester fibers, etc.

For the treatment of textile fibers and textiles the invention dispersions are applied as such or diluted with water, preferably deionized, and used at a concentration expressed in % polymer weight/solution weight (water+polymer) generally from 0.2 to 10%, preferably from 0.25 to 3%, still more preferably from 0.3 to 1.5%, the solute weight being determined as dry residue.

The surface treatment is generally carried out as follows:

application of the invention dispersions to the textile fibers or textiles;

removal of the aqueous solvent by evaporation at temperatures comprised between room temperature and 50° C., optionally by operating in air flow;

heating for about two minutes, in a suitable environment, at a temperature in the range 80° C.–180° C., dependimg on both the hydrogenactive compound covalently linked to the polymer —NCO groups and the fabric type.

The application techniques are those known, for example by spreading, by dipping and subsequent mechanical removal of the polymer excess deposited on the fabrique (padding), or by spraying.

For example, when the application is carried out by spreading, the dispersion can be formulated with additives such as thickening agents, optionally together with the other conventional excipients of these formulations. When the application is by dipping or by spraying the dispersion can be diluted with deionized water in function of the required use.

To unblock the thermolabile groups of the polyurethanes of the invention for the application to textile fibers and textiles, it is possible to use also one or more catalysts selected from those known in the prior art to synthetize polyurethanes. The organometallic or the amino catalysts can be mentioned; those soluble or those dispersible in water such for example: DBTDL or dialkyltin salts containing movable Sn—S linking groups, for example as in the Fascat® 4224 compound, are particularly preferred; an example of amino catalysts is the diazobicyclo octane compound.

The added catalyst amount is such to have concentrations which generally range from 0.1 to 5% by weight and preferably from 0.5 to 1% by weight with respect to the amount of blocked isocyanate.

The skilled man in the field is capable, on the basis of the information available in the prior art, to select the temperature and the treatment times on the basis of the hydrogenactive group linked to the polymer.

By using an aqueous dispersion according to the present invention, the textile "softness" remains unchanged with respect to the untreated specimen and lasting hydro- and oil-repellence properties, which are maintained even after several washings, are conferred to the fabric.

To control that the optimal hydro- and oil-repellence and "softness" combination is maintained even after washings at high temperatures, also in the presence of detergents, tests as for example the following one are carried out. Specimens of white fabric are subjected to a washing in a washing machine for 30 minutes at 60° C. with detergent, rinsed until foam removal and dried. Tests to determine the hydro- and oil-repellence and "softness" are carried out on the treated specimen. In the case of coloured textiles, a washing test is carried out in the washing machine with the specific program, and the fabric after washing is compared with an untreated fabric but subjected to washing under the same conditions.

Tests carried out by the Applicant have shown that after 4 washings, as defined in the Examples, the hydro-/oil-repellence and softness properties of treated textiles remain substantially unchanged.

The textiles treated with the polyurethanes of the invention show furthermore a high transpirability. The optimal combination of the above properties may not be found in the compounds at present on the market.

The following Examples are to be considered for illustrative purposes and cannot be considered limitative of the scope of the present invention.

EXAMPLES

I) Specimen Treatment

The textile specimens are treated with the formulations described in the following Examples, which are applied by padding with a press ratio of 80%. After drying and thermal treatment, the finished specimens have been subjected to the following tests: hydro-repellence, oil-repellence test and textile softness and appearance.

II) Washings

To verify the resistance to washing, specimens of white fabric treated as described in the Examples have been washed in Linitest washing machine for 30 minutes at 60° C. with standard detergent EN 60456 TYPE A (1999) at a concentration of 5 g/litre and bath ratio (textile weight/washing water weight) 1:40. The specimens are rinsed until complete foam removing. Then the washed textiles have been dried in a ventilated oven at 150° C. for 5 minutes, and subjected to oil- and hydro-repellence test as described hereafter, evaluating also the textile "softness" and appearance.

Example 1b

Hydro-repellence Test

An amount of water in the range 50–100 microlitres is deposited by microsyringe on the textile surface. After 60 seconds the asbsorption is evaluated as follows:

| Rating | |
|---|---|
| 5 | Contact angle higher than 100° (the drop has not yet wet the fabric). |
| 4 | Contact angle of the drop comprised between 90° and 100° (the drop has not yet wet the fabric). |
| 3 | Contact angle comprised between 70° and 90° (the drop has wet the fabric and an halo is going to be formed around the deposition point). |
| 2 | Contact angle between 45° and 70° (the drop has wet the fabric and is going to be absorbed). |
| 1 | Contact angle lower than 45° (the drop is almost completely absorbed from the fabric but it is still visible). |
| 0 | The drop has been immediately absorbed, or is absorbed before 60 seconds. |

The specimen passes the test if the rating is of at least 3.

Example 1c

Oil-repellence Test

The test is carried out according to the AATCC Standard test 118–1978, wherein the resistance opposed by the fabric to the penetration of drops formed by oils having a different surface tension, is evaluated. The drop is contacted with the fabric for 30 seconds and the drop is observed under an angle of 45°. One controls if the oil leaves a surface halo or it penetrates the weft. The assigned oil-repellence value is the number which in the following list corresponds to the oil which is neither penetrated nor has left any halo on the fabric.

| rating | oil |
|---|---|
| 1 | vaseline oil |
| 2 | vaseline oil/hexadecane 65/35 |
| 3 | n-hexadecane |
| 4 | n-tetradecane |
| 5 | n-dodecane |
| 6 | n-decane |
| 7 | n-octane |
| 8 | n-heptane |

The tested specimen passes the test if it resists at least tetradecane (oil-repellence value at least 4). The zero value means that the vaseline oil is immediately absorbed or it leaves a halo.

Example 1d

Evaluation of the Softness Degree to the Touch ("Softness")

The evaluation is carried out by comparison with the specimen of the same untreated fabric with the aqueous dispersion of the invention.

The specimen softness is evaluated by the touch before and after the treatment. The evaluation is carried out on No. 10 specimens, giving a point according to the following rating:

3: The specimen after treatment remains unchanged to the touch.
2: The specimen after treatment is less soft and slightly stiff.
1: The specimen after treatment appears changed to the touch and is substantially stiffer than the initial fabric.

The results represent the average of the points assigned to each of the 10 specimens.

The specimen passes the test if the point is at least 2.

The test is carried out at room temperature and at a temperature of −5° C.

Example 1e

Determination of the Number Average Molecular Weight of the Polyurethane Containing Blocked —NCO Groups The —NCO-ended polymer is treated with an excess of trifluoroethanol in THF at 70° C. The solvent and the trifluoroethanol in excess are then removed and the specimen is analyzed by $^{19}$F-NMR spectroscopy. By the analysis of the end groups —HNCOOCH$_2$CF$_3$, by comparison with a standard, the molecular weight is determined.

Example 2 (Comparative)

Synthesis of a Linear Cationic Polyurethane Free from Blocked —NCO End Groups

In a 2 litre glass reactor equipped with mechanical stirring, thermometer, reflux condenser and kept under nitrogen, 171.3 g of IPDI (2 moles with respect to the moles of PFPE) dissolved in 305 g of anhydrous ethyl acetate are introduced. The solution is heated up to 70° C., 2.4 ml of a solution at 20% w/w of Fascat® 4224 are added and 500 g of perfluoropolyether diol (Fomblin® ZDOL) having hydroxyl equivalent weight 650 are dropped in two hours. The mixture is let react for another hour, lastly determining the —NCO titre by the ASTM 2572 method (titration with dibutylamine.HCl). In this way the reaction conversion is controlled, which must be complete for the perfluoropolyether diol.

The reaction temperature is brought to 55° C., and a mixture of butandiol 17.3 g (component e) and N-methyldiethanolamine (NMDEA) 23 g (0.5 moles each with respect to the moles of PFPE) is dropped in about 30 minutes.

The mixture is left under stirring until disappearance of the —NCO band (2270 cm-1 at the IR spectroscopy). Then acetic acid (13.87 g) dissolved in N-methyl pyrrolidone (NMP) (71 g) is added, leaving under stirring for further 30 minutes. The mixture is transferred in a 5 litre flask and 1,660 g of distilled water are added in one hour to the reaction mixture under strong stirring (500 rpm), until obtaining a cationic polymer dispersion in water/organic solvent (ethyl acetate). The ethyl acetate is finally removed by evaporation (40° C., 50 mm Hg, 6.67 KPa), obtaining a substantially aqueous polymer dispersion at 30% w/w.

Example 3

Synthesis of a Linear Cationic Polyurethane having —NCO End Groups Blocked with Butanone Oxime In a 2 litre glass reactor equipped with mechanical stirring, thermometer, reflux condenser and kept under nitrogen, 274.07 g of IPDI (2 moles with respect to PFPE) dissolved in 503.2 g of anhydrous ethyl acetate are introduced. The solution is heated up to 70° C., 3.9 ml of a solution at 20% w/w of DBTDL are added and 900 g of perfluoropolyether diol (Fomblin® ZDOL) having hydroxyl equivalent weight 730 are dropped in two hours. The mixture is let react for another hour and lastly the —NCO titre is determined as in Example 2.

The reaction temperature is brought to 55° C., and a mixture of 21.11 g (0.5548 eq OH) of 1,2 propandiol and of 33.05 g (0.5548 eq OH) of 3-dimethylamino 1,2 propandiol (0.45 moles of each dialcohol with respect to PFPE) is dropped in about 30 minutes in 23.18 g of ethyl acetate. The mixture is left under stirring for about 5 h. Then the —NCO titre is measured. On an aliquot (A) of the so obtained polymer the number average molecular weight is determined as above described, which is 25,000.

At the temperature of 70° C. a solution of butanone oxime 10.74 g (0.123 eq) (0.1 moles with respect to PFPE) is dropped in 4.61 g of ethyl acetate. The reaction mixture is kept under stirring until disappearance of the —NCO band (2270 cm-1 at the IR spectroscopy).

The mixture is cooled to room temperature and acetic acid (19.97 g) dissolved in NMP (124 g) is added, it is left under stirring for 30 minutes, then it is transferred in a 5 litre flask and 2,900 g of distilled water are added in one hour, under strong stirring (500 rpm) until obtaining a cationic polymer dispersion in water/organic solvent mixture. The ethyl acetate is lastly removed by evaporation (40° C., 50 mm Hg, 6.67 KPa), obtaining a substantially aqueous polymer dispersion at 30% w/w.

Example 4

Synthesis of a Linear Cationic Polyurethane having —NCO End Groups Blocked with 3,5-dimethyl Pyrazol In a 2 litre glass reactor equipped with mechanical stirring, thermometer, reflux condenser and kept under nitrogen, 286 g of tetramethyl-xylylendiisocyanate (TMXDI, 1.5 eq/eq PFPE) are introduced. The solution is heated up to 70° C., 3.5 ml of a solution at 20% w/w of DBTDL are added and 1,200 g of perfluoropolyether diol (Fomblin® ZDOL) having hydroxyl equivalent weight 767 are dropped in two hours. The mixture is let react for another hour and lastly the —NCO titre is measured as described in Example 2.

The reaction temperature is brought to 55° C., and a solution of N-methyldiethanolamine (NMDEA), 37.16 g (0.63 eq OH, 0.32 eq/eq PFPE) in anhydrous THF (308 g) are dropped in about 30 minutes. The temperature is brought again to 70° C. and the solution is left for about 5 h at said temperature. Finally the —NCO titre is determined again to control the reaction conversion.

At the temperature of 70° C., 3,5-dimethyl pyrazol (14.93 g, 0.156 moles) is added and the mixture is maintained under stirring at said temperature until disappearance of the —NCO band (IR spectroscopy, 2270 cm-1).

The mixture is cooled to room temperature and a solution of acetic acid (18.23 g) in NMP (155 g) is added and the mixture is left under stirring at room temperature for 30 minutes.

Lastly the solution is transferred in a 5 litre flask and 3,565 g of distilled water are added in one hour, under strong stirring (500 rpm) until obtaining a cationic polymer dispersion in water/organic solvent. The organic solvent (THF) is lastly removed by evaporation (40° C., 50 mm Hg, 6.67 KPa), obtaining a substantially aqueous polymer dispersion at 30% w/w.

Example 5

Synthesis of a Linear Cationic Polyurethane having —NCO End Groups Blocked with Diisopropylamine In a 2 litre glass reactor equipped with mechanical stirring, thermometer, reflux condenser and kept under nitrogen, 230 g of TMXDI (1.5 eq/eq PFPE) are introduced. The solution is heated up to 70° C. and 3.5 ml of a solution at 20% w/w of DBTDL are added. Then 967 g of perfluoropolyether diol (Fomblin® ZDOL) having hydroxyl equivalent weight 767 are dropped in two hours, letting react for another hour. Lastly the —NCO titre is measured.

The reaction temperature is brought to 55° C., and a solution of 30.18 g of NMDEA, (0.5065 eq OH, 0.4 eq/eq PFPE) is dropped in about 30 minutes in 308 g of anhydrous THF.

The temperature is brought again to 70° C. and the solution is left under stirring for about 5 h at the same temperature. Finally the —NCO titre is measured to control the conversion.

At the temperature of 70° C., 12.77 g of diisopropyl amine (0.1262 eq, 0.1 eq/eq PFPE) are added. The mixture is maintained under stirring until disappearance of the —NCO band (IR spectroscopy, 2270 cm-1). The solution is cooled to room temperature and a solution of acetic acid (18.23 g) in NMP (125 g) is added, the mixture is left under stirring for 30 minutes and then it is transferred in a 5 litre flask and 2,900 g of distilled water are added in one hour, under strong stirring (500 rpm) until obtaining a cationic polymer dispersion in a water/organic solvent mixture. The most volatile organic solvents are removed by evaporation (40° C., 50 mm Hg, 6.67 KPa), obtaining a substantially aqueous polymer dispersion at 30% w/w.

Application Examples

Example 6

Application of the Dispersion of Example 3 to Cotton Specimens. Hydro-/oil-repellence and Softness Test The dispersion of Example 3 is used as such, or diluted at differnt concentrtions as from Table 1, to treat cotton specimens as above described sub I) in the paragraph "Examples". The treated specimens were dried and then treated at 150° for two minutes in a ventilated stove.

The data related to the concentration of the polyurethane dispersion used for the treatment, and the results obtained in the hydro-/oil-repellence and "softness" tests evaluated at room temperature (20–25° C.) and at −5° C., are shown in Table 1.

The Table shows that high ratings are obtained in the hydro- and oil-repellence tests, and good values in the textile softness test ("softness").

The surface appearance and the gloss of the treated fabric, with respect to the fabric as such, are not modified by the dispersion application.

Example 7

Application of the Dispersion of Example 4 to Cotton Specimens, Hydro-/oil-repellence and Softness Tests The dispersion of Example 4 is used, containing a polyurethane which differs from that of the dispersion of Example 3 in the following aspects:
- the stoichiometric ratio between the isocyanate/macrodiol components is 1.5:1 instead of 2:1;
- the used diisocyanate is TMXDI instead of IPDI.

With said dispersion, which is used with the same technique of Example 6, some cotton specimens are treated. On the treated specimens the same analyses of Example 6 are carried out.

The results are shown in Table 2, which shows that high ratings in the hydro-/oil-repellence tests and optimal values in the textile softness test ("softness") are obtained.

The "softness" at room temperature and the surface appearance (gloss) of the treated fabric with respect to the fabric as such are not modified.

Example 8

Washing Tests on Specimens Obtained as in Example 7

The textile specimens, treated as described in the previous Example, are subjected to washing tests as described in "Examples", sub II). 3 consecutive washings are carried out at 60° C. and a final washing at 90° C. The same tests of Example 6 are repeated on the specimens. The obtained results are shown in Table 3.

Table 3 shows that the specimens of Example 7, after the washings carried out according to the present Example, substantially maintain the same oil- and hydro-repellence properties, in particular at values higher than or equal to 10 g/litre of the dispersion.

The surface appearance and the gloss of the treated fabric with respect to the fabric as such are not modified. Therefore the dispersions of the invention, applied to the textiles, are capable to confer hydro- and oil-repellence and "softness" properties lasting in the time and resistant to several washings.

Example 9 (Comparative)

Application of the Dispersion of the Example 2 (Comparative) to Cotton Specimens, Hydro-/oil-repellence and Softness Tests The polymer dispersion of the Example 2 (comparative) containing a polyurethane free from blocked —NCO end groups is used.

With said dispersion the cotton specimens are treated as described in the application Example 6, carrying out the same tests.

The results of Table 4 show that the ratings obtained in the hydro- and oil-repellence tests are not satisfactory.

On the same specimens washings are carried out as in the previous Example 8. The results of Table 4 show that the ratings in the hydro- and oil-repellence tests further worsen.

Example 10

Stability Tests on the Dispersion of Example 3

20 g aliquots of the dispersion of Example 3 are transferred in 25 ml glass bottles which are hermetically sealed. 9 specimens in total are prepared.

The specimens, subdivided in 3 groups of 3 bottles each, are thermostated at 5° C., 25° C. and 50° C., respectively.

The stability is followed by examining the specimens at weekly intervals and visually evaluating the dispersion appearance (turbidity, colour, possible presence of unsoluble residues).

The specimens at the beginning of the test appear slightly oplascent and colourless. The stability tests at 5° C. and 50° C. have lasted three months, that at 25° C. 12 months.

At the end of the stability tests the dispersion appearance has remained unchanged; the presence of unsoluble residues has not been noticed in any specimen used in the tests.

Said tests show that the invention dispersions are stable in the time without requiring the addition of specific additives such for example surfactants.

TABLE 1

Ex. 6: dispersion of the cationic polyurethane according to Example 3 applied to cotton fabric. Results of the hydro- and oil-repellence and "softness" tests.

| Test | Polyurethane dispersion conc. (g/l) | | | | |
|---|---|---|---|---|---|
| | 0 | 2 | 4 | 10 | 30 |
| Hydro-repellence | 0 | 0 | 2 | 5 | 5 |
| Oil-repellence | 0 | 0 | 2 | 4 | 4 |
| "Softness" | | | | | |
| - at room t. | 3 | 3 | 3 | 2 | 2 |
| - at t. = −5° C. | 3 | 3 | 3 | 2 | 2 |

TABLE 2

Ex. 7: dispersion of the cationic polyurethane according to Example 4 applied to cotton fabric. Results of the hydro- and oil-repellence and "softness" tests.

| Tests | Polyurethane dispersion conc. (g/l)* | | | | |
|---|---|---|---|---|---|
| | 0 | 2 | 4 | 10 | 30 |
| Hydro-repellence | 0 | 0 | 3 | 5 | 5 |
| Oil-repellence | 0 | 0 | 2 | 4 | 5 |
| "Softness" | | | | | |
| - at room t. | 3 | 3 | 3 | 3 | 3 |
| - at t. = −5° C. | 3 | 3 | 3 | 3 | 3 |

*2 g/l correspond to 0.06% polymer weight/(polymer weight + water weight), 4 g/l = 0.12%, 10 = 0.3%; 30 = 0.9%

TABLE 3

Ex. 8: results of the hydro-repellence, oil-repellence and "softness" tests carried out on the specimens of Example 7 subjected to 4 consecutive washings (PU = polyurethane).

| Tests | PU disper. conc. (g/l) | |
|---|---|---|
| | 10 | 30 |
| Hydro-repellence | 5 | 5 |
| Oil-repellence | 4 | 5 |
| "Softness" (at room t.) | 3 | 3 |

TABLE 4

Ex. 9 comp.: dispersion of the cationic polyurethane (PU) (without blocked -NCO end groups) according to comparative Ex. 2 applied at a concentration of 10 g/litre to cotton fabric. Results of the hydro- and oil-repellence tests.

| Test | Before washings | After washings |
|---|---|---|
| Hydro-repellence | 2 | 1 |
| Oil-repellence | 2 | 1 |

The invention claimed is:

1. Formulations formed by aqueous dispersions of cationic ionomer fluorinated polyurethanes based on (per) fluoropolyethers, having end groups constituted by —NCO groups reacted with hydrogenactive compounds to give covalent bonds stable to water but thermolabile, which comply with the following test: by reacting the hydrogenactive compounds with tetramethyl-xylylenediisocyanate (TMXDI) and by thermal treatment between 80° C. and 180° C. for two minutes in the presence of dibutyltin dilaurate (DBTDL) as catalyst, at least 50% of the —NCO groups are restored, wherein the cationic fluorinated polyurethanes are formed by units deriving from the following monomers:

a) hydrogenated diisocyanates having formula:

OCN—R—NCO (VIa)

wherein R is a bifunctional radical:

$C_2$–$C_{12}$ aliphatic;

$C_6$–$C_{18}$ cycloaliphatic or aromatic, alkylen-cycloaliphatic or aromatic, wherein optionally the cycloaliphatic ring can be substituted with one or more $C_1$–$C_3$ alkyl groups; bicyclo aliphatic or aromatic, wherein the rings are as above, optionally linked by a $C_1$–$C_6$ alkylene chain;

b) bifunctional (per) fluoropolyethers (PFPE) having hydroxyl end groups, with number average molecular weight in the range 400–4,000;

c) one or more of the following diols containing an amino group:

c.1 diols with side amino group, of formula:

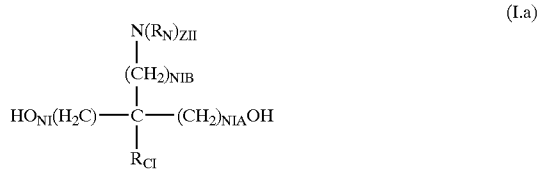

(I.a)

wherein $R_N$ is a linear or branched $C_1$–$C_6$ alkyl, zII is 1 or 2, when zII =1 the nitrogen free valence is saturated with one H atom, $R_{c1}$ is H or $C_1$–$C_4$ alkyl, NI is an integer and ranges from 1 to 4, NIA is an integer and ranges from 0 to 4, NIB is an integer and ranges from 1 to 4.

c.2 diols with amino group in the chain, of formula:

(I.b)

wherein $R_N$ and NI have the above meanings;

d) hydrogenactive compounds forming with the —NCO functions covalent bonds stable at the hydrolysis but thermolabile, as defined in claim 1; and optionally the following:

e) $C_2$–$C_{10}$ hydrogenated aliphatic diols or diamines, $C_4$–$C_6$ cycloaliphatic, optionally substituted with $C_1$–$C_4$ aliphatic chains, and $C_6$–$C_{14}$ aromatic or alkyl aromatic.

2. Formulations according to claim 1, wherein the hydrogenactive compounds restore at 100% the —NCO groups.

3. Formulations according to claim 1, wherein the component d) is an aminoalcohol and the component c) is optional.

4. Formulations according to claim 1, wherein the amounts by weight of the components a), b), c) and d) of the polyurethane, with respect to the total of the components are the following: component a): 5–50%; component b): 50–90%; component c): 1–10%, component c) optionally being absent when component d) is an aminoalcohol, component d): 0.1–10%; and component e): 0–10%.

5. Formulations according to claim 1, wherein the number average molecular weights of the polyurethanes are in the range 5,000–50,000.

6. Formulations according to claim 1, wherein the diisocyanate component a) is selected from the group consisting of: hexamethylendiisocyanate (HDI), trimethylhexamethylenediisocyanate, isophorone diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or its isomers, xylylene diisocyanate, naphthalene-1,5-diisocyanate, p-phenylen-d diisocyanate, and tetramethyl-xylylenediisocyanate (TMXDI).

7. Formulations according to claim 1, wherein the polyurethanes have a fluorine content higher than 15% by weight.

8. Formulations according to claim 1, wherein the functionalized PFPEs component b) comprises repeating units, statistically distributed in the polymer chain, which is one selected from the group consisting of:
($C_3F_6O$), ($CF_2CF_2O$), ($CF(CF_3)$—O), ($CF_2O$), ($CF_2(CF_2)_{x'}CF_2O$), wherein x' is an integer equal to 1 or 2, and ($CF_2CF_2CH_2O$).

9. Formulations according to claim 8, wherein ($C_3F_6O$) is selected between ($CF(CF_3)$—$CF_2O$) or ($CF_2$—$CF(CF_3)O$).

10. Formulations according to claim 8, wherein the repeating units belong to one or more selected from the classes consisting of:

1) —$CF_2$—O—($CF_2CF_2O)_{p'}(CF_2O)_{q'}$—$CF_2$—
wherein:
p' and q' are numbers such that the q'/p' ratio is comprised between 0.1 and 10 and the number average molecular weight is in the above range for component b);

2) —CFY—0—($CF_2CF$ ($CF_3$)O$)_{r'}$—($CF_2CF_2O)_{s'}$—(CFYO$)_{t'}$—CFY—
wherein:
Y is as above defined; r', s' and t' are numbers such that r'+s' is comprised between 1 and 50, the t'/(r'+s') ratio is comprised between 0.01 and 0.05, r'+s' being different from zero, and the molecular weight is in the above range for component b);

3)  —CF(CF$_3$)(OCFY)$_t$(OC$_3$F$_6$)$_u$—OR'$_f$O—(C$_3$F$_6$O)$_{u'}$ (CFYO)$_t$CF(CF$_3$)— wherein:

R'$_f$ is a C$_1$–C$_8$ perfluoroalkylene; u'+t' is a number such that the number average molecular weight is in the above range for component b); t' can also have the zero value; Y is as above;

4)  —CF$_2$CF$_2$O—(CF$_2$(CF$_2$)$_{x'}$CF$_2$O)$_{v'}$—CF$_2$CF$_2$—, wherein:

v' is a number such that the molecular weight is within the above range for the (per)fluoropolyethers diols b), x' is an integer equal to 1 or 2; and 5) —CF$_2$CH$_2$— (OCF$_2$CF$_2$CH$_2$)$_{w'}$—OR'$_f$O—(CH$_2$CF$_2$CF$_2$O)$_{w'}$— CH$_2$CF$_2$— wherein:

R'$_f$ is as above; w' is a number such that the number average molecular weight is within the above range for the (per)fluoropolyethers diols b);

the end groups of the bifunctional perfluoropolyethers component b) being of the —CH$_2$—(OCH$_2$CH$_2$)$_{k'}$— OH type, wherein k' is a number in the range 0–5.

11. Formulations according to claim 10, wherein the repeating units in the ionomer polyurethane PFPEs have a structure as defined in component 1).

12. Formulations according to claim 10, wherein the repeating units in the PFPEs of the ionomeric polyurethane have the following structure:

—CF$_2$—O—(CF$_2$CF$_2$O)$_{p'}$(CF$_2$O)$_{q'}$—CF$_2$— wherein p' and g' are as defined above, and wherein the hydrogenactive compounds are selected from the group consisting of:

ketoximes;

phenols and mono-, di-alkyl substituted phenols, wherein the alkylic chain contains from 1 to 9 carbon atoms;

pyrazole, 3,5-dimethylpyrazole, 1,2,4-triazole;

caprolactam;

aliphatic esters;

amides and imides;

isopropylamine; and aminoalcohols of formula:

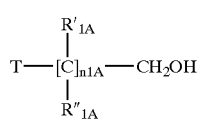

(1-A)

wherein T is a tertiary amino group NR'$_N$R''$_N$, wherein R'$_N$ and R''$_N$, equal or different, are linear or branched C$_1$–C$_6$ alkyl; R'$_{1A}$ and R''$_{1A}$, equal or different, are hydrogen or linear or branched C$_1$–C$_4$ alkyl; n1A is an integer in the range 1–10.

13. Formulations according to claim 1, wherein the polymer amount ranges from 0.2 to 10% determined in percent polymer weight/total weight (water+polymer).

14. A polymerization process to obtain the cationic ionomer fluorinated polyurethanes of the formulations of claim 1, comprising the following steps:

a first step, wherein a —NCO ended bifunctional fluorinated prepolymer is prepared by reacting with diisocyanates component a), in polar organic solvents, partially or totally soluble in water, bifunctional perfluoropolyethers component b);

a second step, carried out as indicated hereafter:

Ia) partial extension of the chain with chain extenders component c) in a lower amount with respect to the —NCO groups present, optionally said extenders comprising also diols and/or diamines component e), the total amount of c)+e) being lower with respect to the —NCO groups present;

Ib) completion of the reaction of the —NCO groups in excess by adding the hydrogenactive compounds component d);

Ic) salification and dispersion in water.

15. The process according to claim 14, wherein the salification Ic) is carried out on the tertiary amine with organic or inorganic acids, or by carrying out the nitrogen quaternarization with nitrogen alkylation agents.

16. A method of making the surfaces of textile fibers and textiles hydro and oil-repellent by applying onto said surfaces the formulations of claim 1.

17. The method according to claim 16, wherein the treatment comprises the following steps:

application of the invention dispersions to the textile fibers or textiles;

removal of the aqueous solvent by evaporation at temperatures comprised between room temperature and 50° C., optionally by operating in air flow;

heating for about two minutes, in a suitable environment, at a temperature in the range 80° C.–180° C., depending on both the hydrogenactive compound covalently linked to the polymer —NCO groups and the fabric type.

18. The method according to claim 17, wherein, in the heating step, the catalysts employed in the polyurethane synthesis are used.

19. The method according to claim 18, wherein the catalyst amount ranges from 0.1 to 5% by weight with respect to the amount of blocked isocyanate.

20. Textile fibers and textiles treated with the formulations according to claim 1.

21. Formulations according to claim 12, wherein the ketoximes are selected from the group consisting of methylethylketoxime, 2,6-dimethyl-4-heptamone-oxime, and 2-heptanone oxime; the aliphatic esters are selected from the group consisting of ethyl malonate and ethyl acetoacetate; and the amides and imides are selected from the group consisting of methyl acetamide, succinimide, and acetanilide.

* * * * *